Patented Mar. 2, 1937

2,072,107

UNITED STATES PATENT OFFICE 2,072,107

PROCESS FOR PRODUCING HIGH BOILING POLYMERS USEFUL FOR BLENDING AND OTHER PURPOSES

Stewart C. Fulton and Louis A. Mikeska, Elizabeth, N. J., assignors to Standard Oil Development Company, a corporation of Delaware No Drawing. Application June 6, 1933, Serial No. 674,520

13 Claims. (Cl. 87—9)

The present invention relates to high molecular weight polymers and particularly to hydrocarbon polymers of a non-asphaltic type, especially those soluble in petroleum fractions such as naphtha, lubricating oil and the like, and to a process for producing these materials.

The invention will be fully understood from the following description.

Certain polymers of a non-asphaltic type are known which have a property of greatly thickening their solvents and at the same time reducing the slope of the curve of viscosity with temperature of their solvent mixtures. The polymers of this type which are soluble in hydrocarbons and particularly in petroleum hydrocarbons are of especial value because of their use as blending agents for lubricating and other oils. According to the present invention polymers of this type are obtained from cheap, readily available raw materials.

According to the present invention polymers, or more properly condensation products, are obtained by reaction of substances of two different classes. The first of these substances is an aliphatic compound of relatively short chain containing two halogen groups and as an example of such product, dichlormethane, ethylene dichloride may be mentioned, but similar products obtained from heavier aliphatic hydrocarbons, up to say about 5 carbon atoms, are useful. It will be understood that other halogens besides the chlorides can be used and those materials in which the halogen atoms are attached to carbon atoms at opposite ends of the chain are particularly desirable. Ethylene dichloride is especially useful not only because of its cheapness and availability, but also because of the improved mixture obtained therefrom.

The other ingredient used in the present process is a material of cyclic structure such as the aromatics or hydroaromatics. Of these the hydrocarbons are generally preferred and benzol is used in preference to the other materials such as naphthalene, anthracene or the hydrogenated or alkylated substitution products, phenols, aromatic amines, such as aniline, and pyridine and similar ring structures. It will be understood that the simple hydrocarbons and benzol in particular are preferable to the other ingredients named, especially when used in connection with ethylene dichloride.

The two reactants described above are mixed ordinarily in equimolecular proportions and a catalyst is used for the condensation. The catalyst preferred is one of the active halide type including anhydrous aluminum chloride, zinc chloride, boron fluoride and the like. The proportion of catalyst may vary but good results are obtained with say 0.1 mol. of catalyst for a mixture containing 1 mol. of the two reactants. Temperature may vary widely but in general is quite low, preferably from about 20 to 50° C. It will be understood that the temperature, the amount of catalyst, and the particular catalyst used may be varied and adjusted to obtain the desired results. In general an increased amount of catalyst allows reaction to be carried out at a lower temperature and for a shorter time.

The reaction which takes place is a condensation in which many molecules of each of the two ingredients combine into a single molecule and it is believed that the aromatic or other cyclic units alternate with the short aliphatic chains. In the above manner extremely large molecules are produced with molecular weights greatly in excess of that of diphenyl ethane. This material is produced to some extent in the reaction and it may be distilled off and reused in place of the original ingredients. Diphenyl ethane is itself a crystalline solid but as the molecular weight increases into the range contemplated in the present application, the crystalline character of the product disappears and it takes on an amorphous or resinous character. Within this range the lower molecular weight products, up to say 1,000 or 1,200, are viscous oily liquids which are largely soluble in hydrocarbon oils and particularly in lubricating oils. In the lower range of molecular weights these oily liquids tend to show relatively steep viscosity-temperature curves but with increasing molecular weight the curves tend to flatten and the viscosity index rises.

As the molecular weight increases over about 1,000 the products become plastic solids which are described here as "soluble." They are in fact quite soluble in chloroform, ethylene dichloride, carbon disulfide, carbon tetrachloride and similar solvents but are not very soluble in petroleum oils, especially lubricating oils of high viscosity index. The so-called "soluble" plastic resins are obtained over a molecular weight range of from about 1,000 to 2,500 and if the molecular weight increases beyond this point, insoluble rubbery solids are produced. These materials are not only insoluble in petroleum hydrocarbons but also even in the solvents of higher power such as chloroform, carbon disulfide and the like. It is desirable for the present purposes to produce either the oily polymer or the soluble polymer which can, by the methods which will be disclosed below, be converted into a product freely soluble in petroleum oils.

The character of the product will be readily controlled since the reaction rate is relatively slow and this can be done by stopping the reaction at the proper time. As stated above, the reactants apparently combine in substantially equimolecular ratio but by greatly increasing the proportion of benzol or other aromatic the reaction may be brought to a stop at any desired degree of polymerization. This method can be used to conveniently stop the reaction automatically at a predetermined average molecular weight by simply adjusting the proportion of aromatics above the equimolecular ratio at the start. It is difficult to describe the exact point at which the reaction should be stopped since the product is ordinarily admixed with solvent and catalyst, but it has been found that the consistency or viscosity of a reaction mixture of known proportions of reactants and solvent can be judged by a skilled operator after a few experimental trials so that he will be able to stop the reaction when a product of the desired average molecular weight is obtained. The reaction may be stopped by hydrolyzing the catalyst at the desired point for example with water, acid or alkali. Alcoholic ammonia is particularly suitable for this purpose.

As indicated above, the so-called "soluble" resins are not freely soluble in petroleum products especially lubricating oils and it is highly desirable to make them so. It has been found, however, that they can be readily solubilized by hydrogenation but preferably by alkylation. It will be understood that the degree of hydrogenation or alkylation is directly proportional to the degree of solubility. Alkylation may be accomplished in any well known manner, for example, by the reaction of alkyl halides in the presence of sodium or of aluminum chloride while dissolved in suitable solvents such as carbon disulfide. In accomplishing the alkylation it is preferable to use normally liquid alkyl halides such as propyl, butyl and amyl chlorides but lower chlorides may be also used. The hydrogenation can be accomplished at low hydrogenating temperatures with nickel or similar catalysts or at relatively higher temperatures where a partial decomposition occurs.

The oily products produced by the present process may be used alone either as lubricants, for example as transmission oils, or they may be blended with natural or other artificial oils. They may be added to gasoline or waxes, such as paraffin wax, or they may be used in the manufacture of greases. The soluble resins may be used in solvents which are capable of dissolving them and in the lower molecular weight range they may often be used in lubricating compositions where the amount required is below the range of solubility. However, it is more often the case that the solubility is not sufficient for the purpose and in such cases modified or solubilized resins are used, as indicated above. These materials are of great value as addition agents in gasoline, lubricating oils, Diesel fuels and the like. They may also be used in solid lubricating compositions. As examples of the present process the following may be considered.

*Example 1*

To 200 parts by weight of benzol, 255 parts of ethylene dichloride is added along with 40 parts of aluminum chloride. Temperature is maintained at 40° C. for about four hours and at the end of this time the catalyst is hydrolyzed and removed with alcoholic ammonia.

The product is a homogeneous oily material which when distilled to 250° C. at 1 mm. absolute pressure yields a relatively large quantity of a distillate which is rich in diphenyl ethane. The residue consists of 77 parts by weight of an oily material freely soluble in ethylene dichloride, chloroform and carbon disulfide. It had a molecular weight below 1,000, Saybolt viscosity of 97 seconds at 210° F. and a viscosity index of 57. By increasing the time of polymerization a higher molecular weight product is produced which has substantially the same solubility characteristics but with a viscosity of 200 seconds at 210° F. The polymer had a viscosity index well over 100. These oils are suitable for use in an unblended condition, for example as gear oils, cylinder oils and the like.

*Example 2*

To 200 parts by weight of benzol, 250 parts of ethylene dichloride and 20 parts of aluminum chloride are added and the mixture is refluxed for about one hour at 70 to 80° C. until a certain consistency is obtained. The catalyst was then hydrolyzed and removed. The product was now distilled to 225° C. at 1 mm. pressure and 186.5 parts of a soft rubbery plastic resin is obtained as a residue. It has an average molecular weight of 1,300 and is soluble in benzol, ethylene dichloride and carbon disulfide. It has been found to be sparingly soluble in lubricating oils. The product itself is stringy and sticky in appearance, transparent in thin films and and about the same color and cast as a heavy petroleum cylinder oil.

A product of substantially the same character can be made by reducing the amount of catalyst to say about 10 parts by weight but the time required will then be about three hours more or less.

*Example 3*

The resinous material produced in Example 2 is taken up in carbon disulfide, 200 parts of the solvent to 50 parts of the resin. Fifty parts of secondary amyl chloride is then added and the reaction brought about with 5 parts of aluminum chloride at 20° C. Alkylation is completed within about three hours and the product is distilled to remove solvent and a small amount of lighter hydrocarbons. The alkylated product is recovered comprising 75 parts by weight. This material is similar in appearance to the product of Example 2 but somewhat less sticky and more rubbery in appearance. It is freely soluble in petroleum oils in all proportions. When added in proportion of 5% to a paraffin base lubricating oil it showed good thickening powers and markedly increased viscosity index. On the other hand, it showed little or no effect on the pour point and flash point and only a slight darkening in color.

| | Original oil | 5% blend |
|---|---|---|
| Viscosity at 100 Saybolt seconds | 198 | 284 |
| Viscosity at 210 Saybolt seconds | 46.4 | 55 |
| Viscosity index | 93 | 125 |

The blend is an excellent light motor oil.

Example 4

As a further illustration of the nature of the present products, reaction was conducted in much the same manner as in Example 2, except that the time of reaction was increased until a heavier consistency was reached. The product when obtained free from solvent and light products had an average molecular weight of 2,000 and was less soluble than the product of Example 2 and also less plastic. On alkylation with amyl chloride in proportion of 2 parts thereof to 1 of the resin, an alkylation product is obtained which is freely soluble in petroleum oils and showed the following blending properties:

|  | Original oil | 5% blend | 10% blend |
|---|---|---|---|
| Viscosity at 100 Saybolt seconds | 198 | 348 | 606 |
| Viscosity at 210 Saybolt seconds | 46.4 | 61.5 | 83 |
| Viscosity index | 93 | 126 | 129 |

The blended products are excellent motor lubricating oils of medium and heavy grades respectively.

The oils produced by the present method are of good quality for lubricating and other purposes. The lighter ones may be distilled and both light and heavy may be refined by the ordinary methods using acid, clay, alkali, and the like. These products are extremely resistant to decomposition by heat, to oxidation, sludge formation and the like. They are ordinarily low in pour because they are free from wax, but due to the extremely high viscosity of the higher molecular weight materials, the pour point will rise as that would be expected. Blends with lighter oils, however, in which moderate viscosities are produced have low pour points.

The present products are readily distinguished from other types of condensation products, for example the product produced by the polymerization of lower olefines alone is characterized by a very low viscosity index and little or no value for blending purposes, and the polymer produced from higher olefines, such as cracked waxes, although of high molecular weight do not possess the valuable blending properties disclosed herein. Furthermore, polymers obtained by the reaction of active derivatives of paraffin wax with aromatics such as naphthalene are readily distinguished from the present materials which are superior agents for increasing viscosity index and do not possess pour inhibiting properties.

The present invention is not to be limited to any theory of the manufacture of the present polymerized products nor to any particular product obtained by the use of specific reagents, nor to any particular catalyst, but only to the following claims in which it is desired to claim all novelty inherent in the invention.

We claim:

1. A lubricating composition comprising a hydrocarbon base oil containing in solution a thickening polymer of the non-asphaltic chain type comprising alternate aromatic rings and aliphatic chains.

2. A lubricating composition comprising a hydrocarbon base oil containing in solution a thickening polymer derived by condensing a saturated dihalo derivative of low boiling aliphatic hydrocarbons having the halogen atoms attached to opposite ends of the carbon chain of said hydrocarbons, with an aromatic hydrocarbon.

3. Composition according to claim 2 in which the thickening polymer comprises a condensation product of ethylene dichloride and benzol.

4. A composition of matter comprising a blend of a liquid to solid hydrocarbon and a hydrocarbon polymer of high molecular weight obtained by the condensation of a saturated dihalo derivative of an aliphatic hydrocarbon of not more than five carbon atoms with a hydrocarbon of cyclic structure.

5. A composition of matter comprising a petroleum hydrocarbon oil containing in solution a high molecular weight hydrocarbon polymer prepared by the condensation of a saturated dihalo derivative of a gaseous aliphatic hydrocarbon with an aromatic hydrocarbon.

6. Composition of matter according to claim 5 in which the said polymer is obtained by condensation of ethylene dichloride with benzene.

7. Composition of matter according to claim 5 in which the solubility of the said polymer in the said hydrocarbon oil has been increased by hydrogenating the polymer.

8. Composition according to claim 5 in which the solubility of the said polymer in the said hydrocarbon oil has been increased by alkylating the polymer.

9. An improved lubricating oil comprising a hydrocarbon base oil containing in solution a hydrocarbon polymer of high molecular weight obtained by the condensation of a saturated dihalo derivative of an aliphatic hydrocarbon of not more than five carbon atoms with a hydrocarbon of cyclic structure.

10. A lubricating oil according to claim 9 in which the said polymer has a molecular weight below about 1000 and is freely soluble in the said oil.

11. A lubricating oil according to claim 9 in which the said polymer has a molecular weight above about 1000 and its solubility in the said oil has been increased by hydrogenating the said polymer.

12. A lubricating oil according to claim 9 in which the said polymer has a molecular weight above about 1000 and its solubility in the said oil has been increased by alkylating the said polymer.

13. A lubricating composition comprising a hydrocarbon base oil and a thickening polymer of the nonasphaltic chain type comprising alternate aromatic rings and aliphatic chains and rendered soluble in the lubricating oil by a process selected from the class of hydrogenation and alkylation.

STEWART C. FULTON.
LOUIS A. MIKESKA.